(12) United States Patent
Lalancette et al.

(10) Patent No.: US 7,368,661 B2
(45) Date of Patent: May 6, 2008

(54) METHOD FOR MANUFACTURING ELECTRICAL BOXES

(75) Inventors: Daniel Lalancette, St-Jean-sur-Richelieu (CA); Ioan Liviu Lupsa, Dollard-des-Ormeaux (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/507,884

(22) Filed: Aug. 22, 2006

(65) Prior Publication Data

US 2007/0051527 A1 Mar. 8, 2007

Related U.S. Application Data

(60) Provisional application No. 60/713,808, filed on Sep. 2, 2005.

(51) Int. Cl.
*H02G 3/08* (2006.01)

(52) U.S. Cl. .............. 174/50; 174/54; 174/58; 439/535; 248/906

(58) Field of Classification Search ........ 174/50, 174/54, 58, 17, 18, 48, 49; 493/10, 126; 220/4.02, 3.6, 3.9; 439/535; 248/906
See application file for complete search history.

(56) References Cited

U.S. PATENT DOCUMENTS

| | | | |
|---|---|---|---|
| 230,452 A * | 7/1880 | Watkins | 229/171 |
| 4,006,670 A * | 2/1977 | Royal | 493/10 |
| 4,239,148 A * | 12/1980 | Sorenson et al. | 229/143 |
| 4,263,472 A | 4/1981 | Maheu | |
| 4,315,100 A | 2/1982 | Haslbeck et al. | |
| 4,422,701 A | 12/1983 | Anderson | |
| 4,578,528 A | 3/1986 | Borsh et al. | |
| 4,674,646 A | 6/1987 | Teron | |
| 4,927,039 A | 5/1990 | McNab | |
| 4,986,466 A * | 1/1991 | Colby | 229/193 |
| 5,272,279 A | 12/1993 | Filshie | |
| 5,480,053 A | 1/1996 | Jorgensen | |
| 5,594,207 A | 1/1997 | Fabian et al. | |
| 5,680,947 A | 10/1997 | Jorgensen | |
| 5,703,327 A | 12/1997 | Jorgensen | |
| 5,824,952 A | 10/1998 | Bordwell et al. | |
| 5,866,845 A | 2/1999 | Markiewicz et al. | |
| D422,266 S | 4/2000 | Roesch | |
| 6,057,509 A | 5/2000 | Simmons | |
| 6,278,058 B1 | 8/2001 | Anderson | |
| RE38,120 E | 5/2003 | Bordwell et al. | |
| 6,737,576 B1 | 5/2004 | Dinh | |

FOREIGN PATENT DOCUMENTS

| | | |
|---|---|---|
| CA | 2133274 | 5/1995 |
| EP | 0 724 318 | 7/1996 |
| JP | 01-321807 | 12/1989 |
| JP | 2-217564 | 8/1990 |
| JP | 2-246769 | 10/1990 |

* cited by examiner

*Primary Examiner*—Dhiru R. Patel
(74) *Attorney, Agent, or Firm*—Hoffmann & Baron, LLP

(57) ABSTRACT

The present invention is directed to a method of manufacturing an electrical box to reduce the amount of scrap material therefrom. More particularly, the present invention provides a metallic electrical outlet box that is formed from a sheet of material and folded into an electrical box.

8 Claims, 8 Drawing Sheets

METHOD FOR MANUFACTURING ELECTRICAL BOXES

CROSS-REFERENCE TO RELATED APPLICATION

This application claims priority to U.S. Provisional Patent Application No. 60/713,808, filed on Sep. 2, 2006, which is incorporated herein by reference.

FIELD OF THE INVENTION

The present invention relates to a method of producing an electrical box for mounting an electrical wiring device to a support member. More specifically, this invention relates to an electrical box design formed from sheet material which is designed to minimize the amount of scrap material.

BACKGROUND OF THE INVENTION

Electrical boxes are constructed in a variety of ways for housing electrical wiring devices such as electrical receptacles or outlets, switches, etc. Electrical boxes can be constructed of either metal or plastic depending upon the desired application for the electrical box.

Many electrical outlet boxes are formed of metal. These metallic outlet boxes typically include a back wall, perimetrical side walls and an open-front face defining a box interior through which a switch or receptacle is placed. The boxes are typically constructed from multiple walls which are assembled together.

One common technique for forming boxes is to fold a stamped planar sheet of metal into a box configuration. In one folding technique a U-shaped configuration is formed as to define the top, bottom and back walls. Side walls may be attached to the U-shaped member to form the box. Other folded box techniques include cutting the sheet metal into a cross-shape where side walls of the box extend from each edge of the back wall. Each side wall is bent perpendicular to the back wall and the edges of the side walls are connected to each other by tack welding, for example.

In either technique, material around the folded portions is disposed of as scrap. The large amount of scrap metal increases the cost of manufacturing of the box.

It is therefore desirable to produce a more efficient way to manufacture a box with the least amount of scrap material produced therefrom.

SUMMARY OF THE INVENTION

The present invention provides a method of manufacturing an electrical box including the steps of providing a sheet material, positioning a die for stamping out a first blank from the sheet material, stamping the first blank out of the sheet material and folding the first blank into a box shape to provide an electrical box. The first blank includes two first side wall portions attached to either side of a first back wall portion at opposing first folded edges by material continuity, and one first end wall portion is attached to each first side wall portion by material continuity and extending in opposite directions from the first side wall portions. The first back wall portion being defined by two first opposing free edges and two first opposing folded edges.

The present invention further provides for a method of manufacturing more than one electrical boxes including the steps of providing a sheet material, stamping the first blank out of the sheet material and aligning the die relative to a the sheet material to stamp a second blank from the sheet material, stamping said second blank out of said sheet material and folding the blanks into a box shape to provide electrical boxes therefrom. The second blank includes two second side wall portions attached to either side of a second back wall portion at opposing folded second edges by material continuity, and one second end wall portion is attached to each second side wall portion by material continuity and extending in opposite directions from the second side wall portion. The second back wall portion is defined by two opposing second free edges and two opposing second folded edges. One of the second end wall portions of the second blank is aligned with one of said first end wall portion of the first blank. The first side wall is aligned with the second end wall, the first back wall is aligned with the second back wall, and the first sidewall is aligned with the second end wall to minimize scrap material between the first blank and the second blank.

The present invention further provides for a blank for forming an electrical box including two side wall portions attached to either side of a back wall portion at opposing folded edges by material continuity, and one end wall portion attached to each side wall portion by material continuity and extending in opposite directions from the side wall portion, the back wall portion being defined by two opposing free edges and the two opposing folded edges.

DETAILED DESCRIPTION OF THE PREFERRED EMBODIMENTS

The present invention provides an electrical outlet box. More particularly, the present invention provides a metallic electrical outlet box that is formed from a sheet of material and folded into an electrical box. The design and method of manufacturing the electrical box of the present invention reduces the amount of scrap metal produced.

Figure 1:
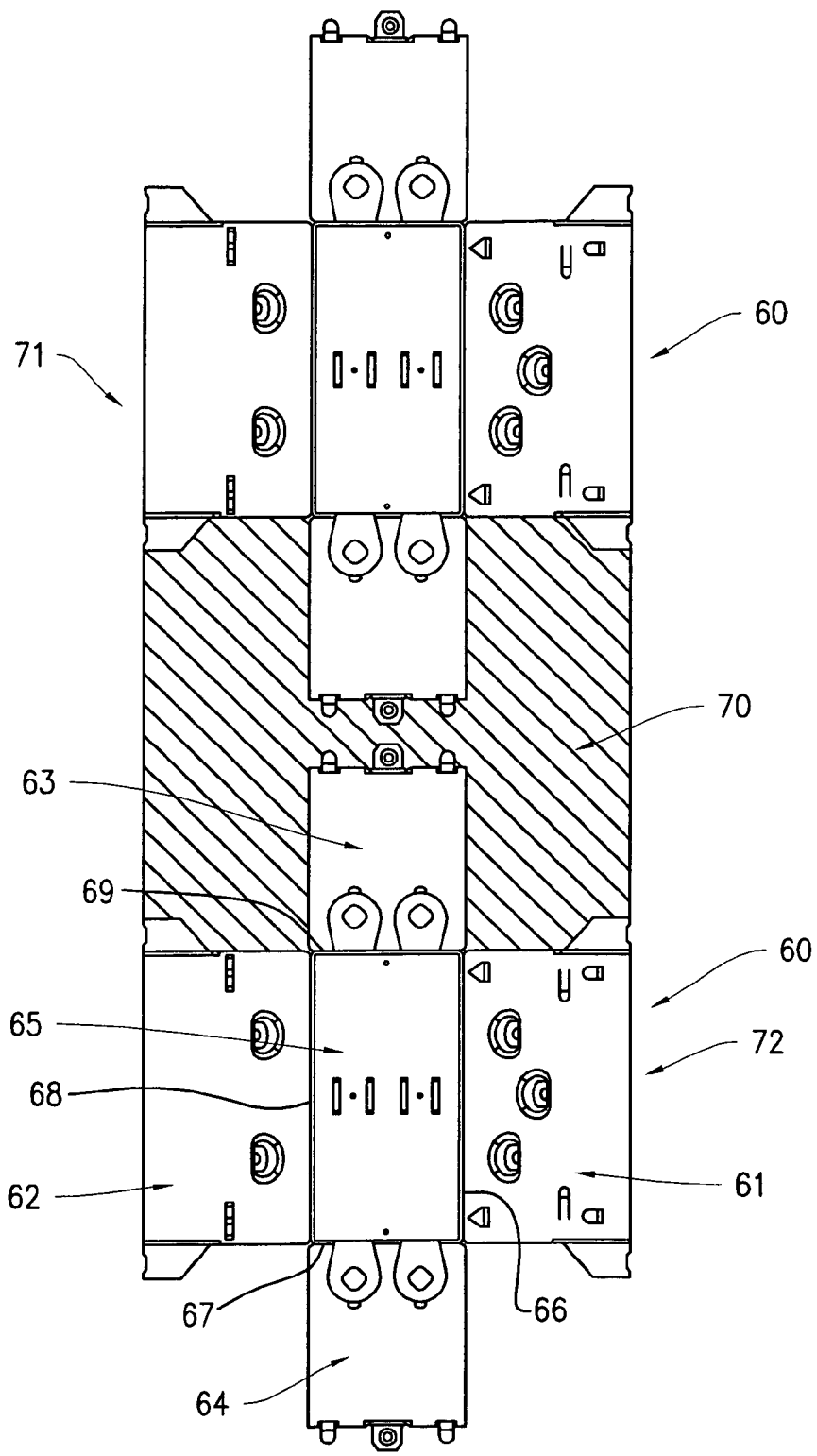
FIG. 1 is a top view of sheet material die cut of an electrical box of the prior art.
Figure 2:
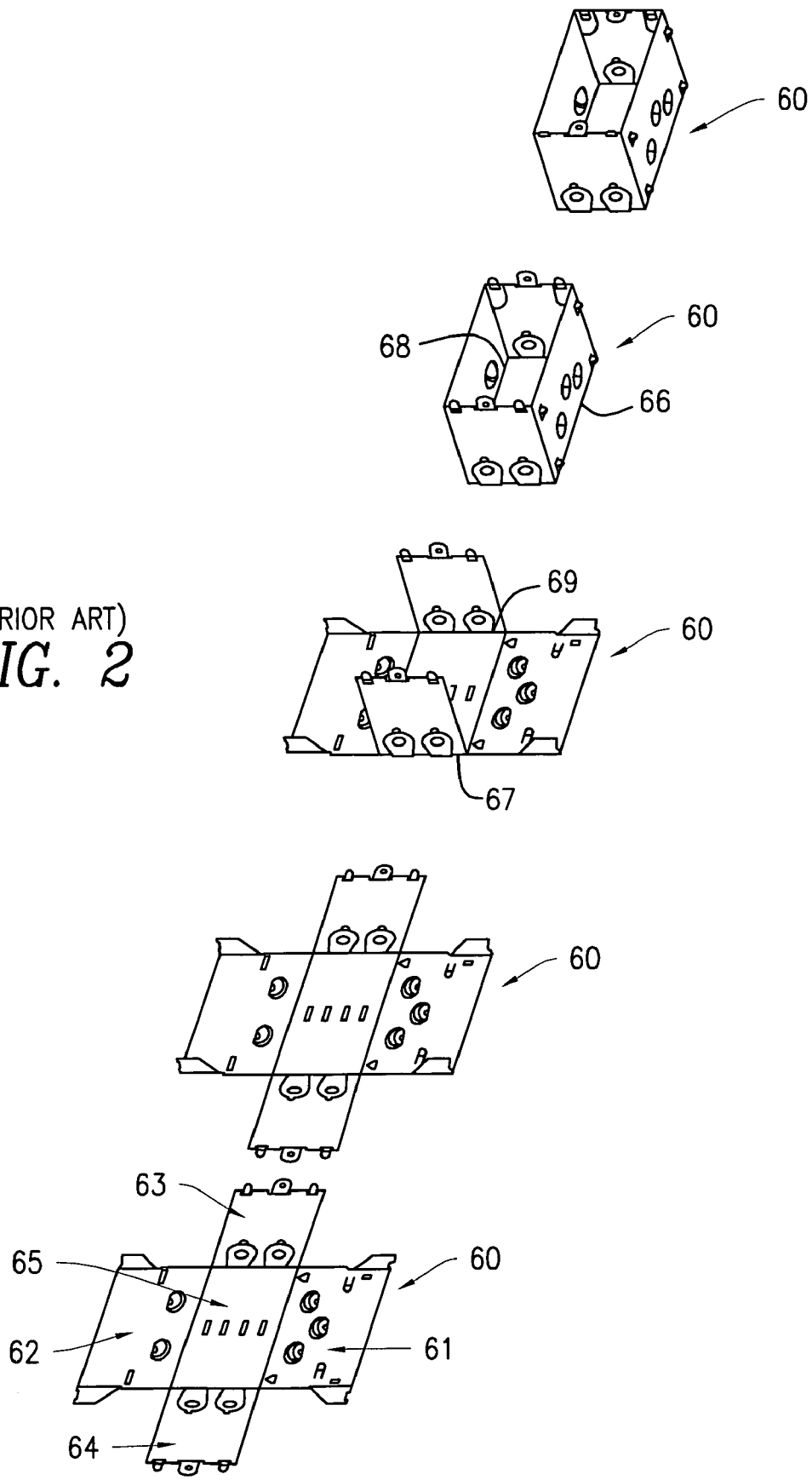
FIG. 2 is a perspective view of the steps of bending of FIG. 1.

Referring to FIGS. 1 and 2 one prior art technique is shown for forming an electrical box from sheet material which is stamped and folded.

FIG. 1 shows a piece of sheet material which has been die cut to form two distinct folded electrical boxes 60. Each prior art electrical box 60 is formed by die cutting a pair of blanks 71, 72 into a t-shaped form. Specifically, each side wall 61, 62, 63, and 64 depend directly from each folded edge of the back wall 65. The back wall 65 is defined by the folding edges 66, 67, 68, 69 which is a shared folding edge of walls 61, 64, 62, and 63, respectively. In this example two identical boxes may be formed from a single stamped sheet. The scrap material 70 remains between the blanks 71, 72 which formed each of the two boxes. This scrap material 70 is unusable waste which is discarded thereby increasing the cost of manufacture. In this example two identical boxes may be formed from a single stamped sheet.

FIG. 2 shows the assembly of one of the blanks to form a box shape of the electrical box 60. Specifically, each wall 61, 62, 63 and 64 is bent along the fold lines 66, 67, 68 and 69, respectively, to extend perpendicular to the back wall 65, as shown in FIG. 2.

Figure 3:
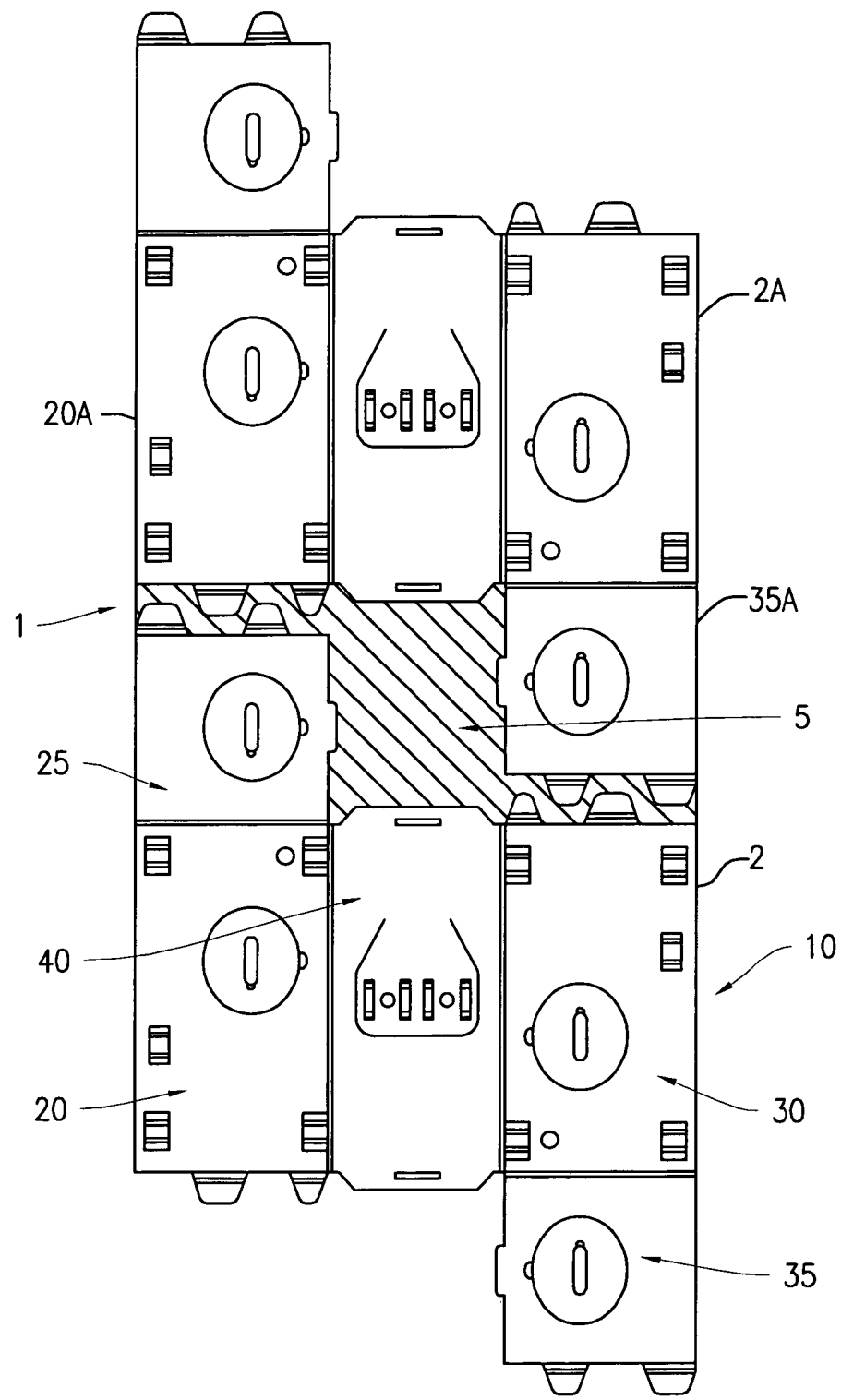
FIG. 3 is a top view of sheet material die cut of an electrical box of the present invention.

The present invention forms a pair of electrical boxes from a single die stamped sheet with a reduction in the scrap material therebetween. Referring to FIG. 3 a die cut of a folded electrical box assembly 10 of the present invention is shown. A unitary blank of sheet material 1 utilized to construct electrical box assembly 10 is first stamped to form the die cut blank 2. The blank 2 includes a two side wall portions 20, 30 being attached to a back wall portion 40 by material continuity. First end portion 25 and second end wall portion 35 depend from the first side wall portion 20 and the second side wall portion 30, respectively, by material continuity. A second blank 2A which is similar to blank 2 is cut out of the sheet material 1 in a similar position as blank 2 so as to reduce the amount of scrap material 5. Specifically, the first end wall portion 25 of the blank 2 is directly below the first side wall portion 20A of the second blank 2A and across from the second end wall portion 35A of the second blank 2A, as shown in FIG. 3. The amount of scrap material of the present invention is reduced by about 75% as compared to prior art die cut formation of the type shown in FIG. 1. The blanks are then folded to form an integral, one piece, unitary electrical box assemblies as discussed below in more detail. Also, a plurality of conventional knockouts and/or auxiliary holes (not shown) can be stamped into the unitary blank as needed or desired.

Figure 4:
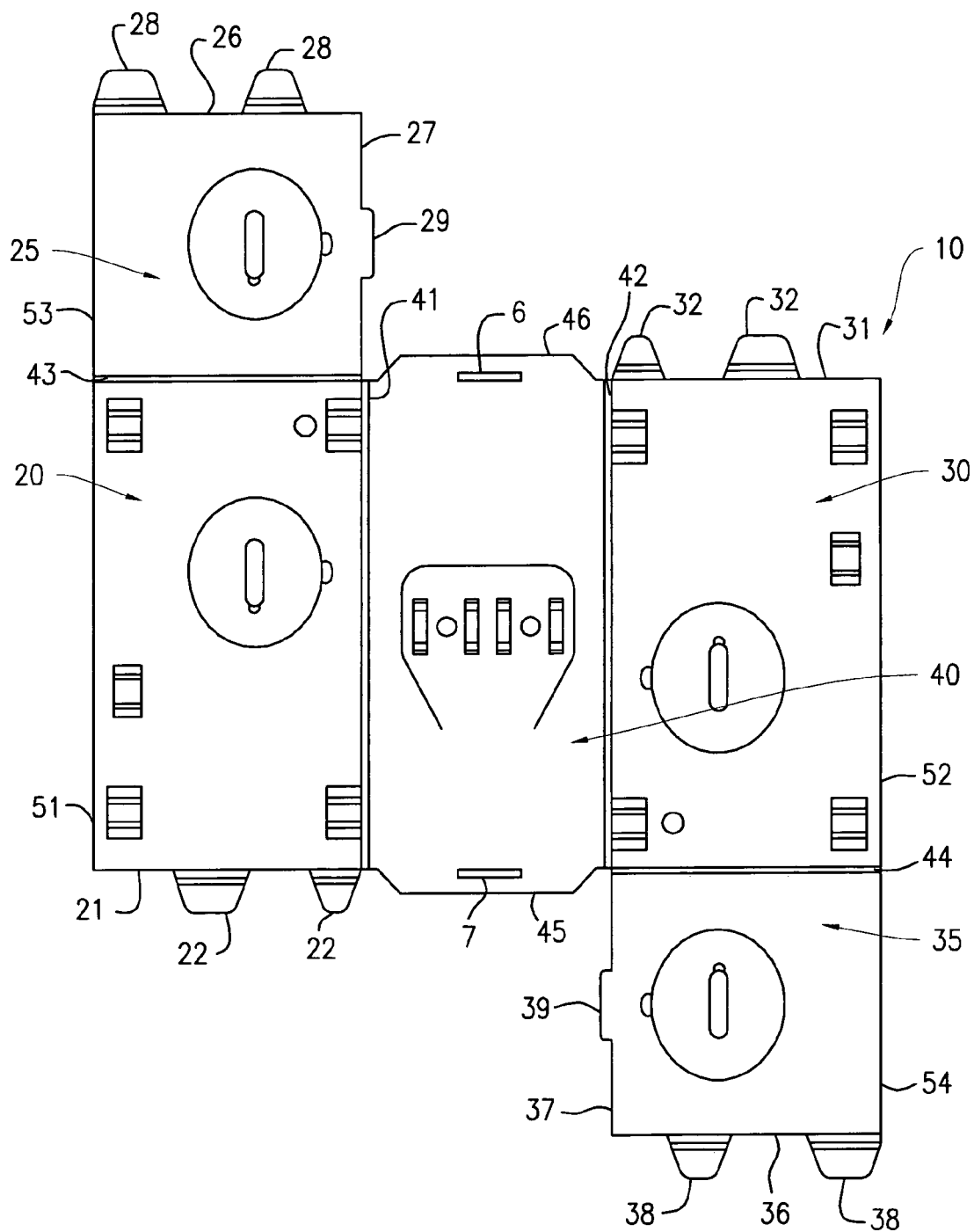
FIG. 4 is a perspective top view of a strip of sheet metal being die cut to form electrical boxes of the presenting invention
Figure 11:
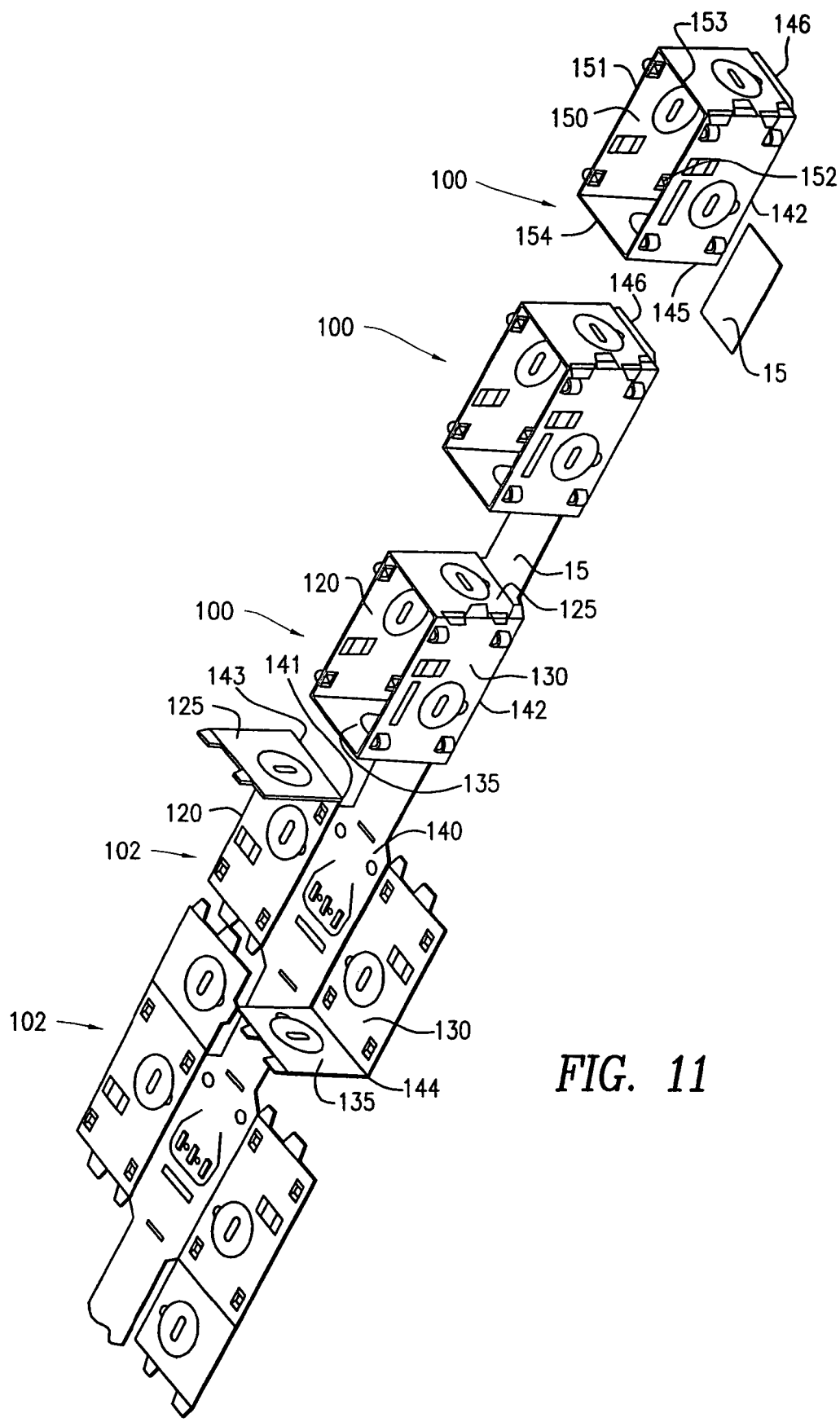
FIG. 11 is a perspective view of steps in forming the die cut blanks of FIG. 4 into electrical boxes.

Further contemplated is a continuous process of die cutting and folding electrical boxes of the present invention as shown in FIG. 4. The multiple blanks 102 of FIG. 4 are similar to the blank 2 of FIG. 3. The electrical box 100 of FIG. 4 is substantially similar to the electrical box 10 of FIG. 3. FIG. 4 shows multiple blanks 102 being produced from a strip of sheet material 101 instead of just a pair of blanks 2, 2A being produced from a single die stamped sheet as shown in FIG. 3. The strip of sheet material 101 is introduced in a die installed on a press. The die can cut out the blanks 102 alone, or a progressive die may be used to gradually cut blanks 102 and perform all other operations, such as piercing, embossing, and bending as shown in FIGS. 4 and 11. The continuous process produces multiple blanks 102 as shown in FIG. 4 and reduces the scrap material 15 between each consecutive blank.

As shown in FIGS. 3, 5-10, when the unitary blank 2 of sheet material 1 is folded, electrical box assembly 10 forms a box shape. The electrical box assembly 10 includes a back wall portion 40, a first side wall portion 20 coupled to back wall portion 40 by a first fold line 41, a second side wall portion 30 coupled to back wall portion 40 by second fold line 42, a first end wall portion 25 coupled to first sidewall portion 20 by a third fold line 43, and a second end wall portion 35 coupled to second side wall portion 30 by a fourth fold line 44.

Figure 5:
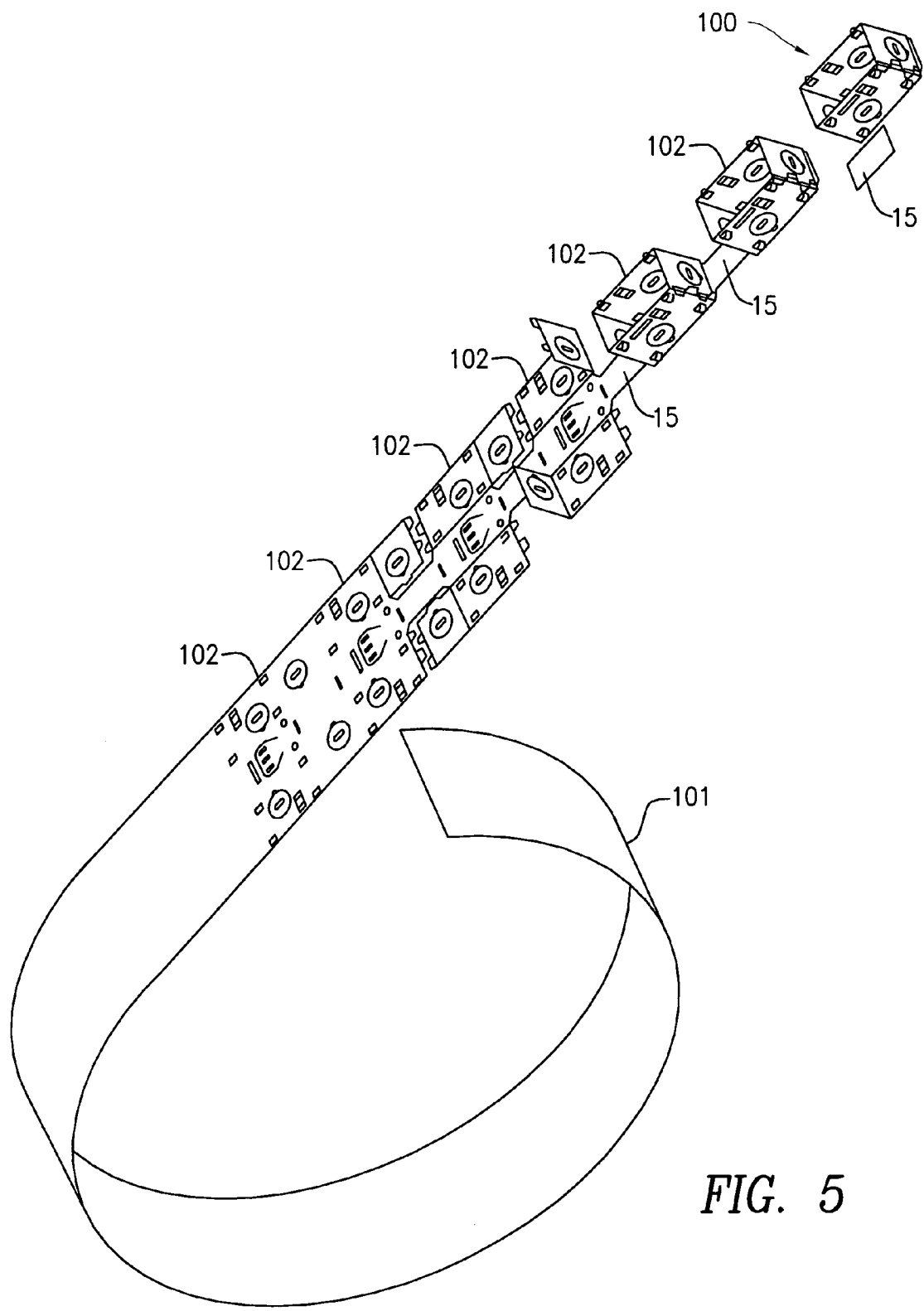
FIG. 5 is a top view of a die cut blank of the embodiment of the electrical box of the present invention.

Referring to FIG. 5, back wall portion 40, first side wall portion 20 and second side wall portion 30 are substantially flat, planar members having substantially the same size. In particular, fold lines 41 and 42 are substantially parallel and form a pair of opposite edges of bottom wall portion 40.

Back wall portion 40 has two opposing free edges being first back free edge 45 and second back free edge 46. Back free edges 45, 46 are substantially parallel and form the first pair of opposite edges of the back wall portion 40. Back free edges 45 and 46 are perpendicular to first folded line 41 and second folded line 42. First folded line 41 and second folded line 42 are substantially parallel and form the second pair of opposite edges of the back wall portion 40. Additionally, back wall portion 40 includes receiving slots 6, 7 for attachment of first end wall portion 25 and second wall portion 35 thereto.

First side wall portion 20 has a substantially flat, planar, rectangular shape and a first free edge 21 which is substantially parallel to the edge formed by third fold line 43. First side wall portion 20 has first open edge 51 which is substantially parallel to the edge formed by first fold line 41, and extends perpendicularly between first free edge 21 and third fold line 43. First free edge 21 is substantially aligned with fourth fold line 44. When electrical box 10 is folded, first side wall portion 20 is bent along first fold line 41 to extend substantially perpendicular to back wall portion 40. Additionally, first coupling flaps 22 extend from first sidewall free edge 21 to provide attachment of the first sidewall portion 20 to the first end wall portion 25.

Second side wall portion 30 is similar to first side wall portion 20 having a substantially flat, planar rectangular shape with two free edges perpendicular to each other and two edges formed by fold lines. Specifically, second side wall portion 30 has a second side free edge 31 extending substantially parallel to the edge formed by fourth fold line 44. Second side wall portion 30 has second open edge 52 which extends perpendicularly between second side free edge 31 and fourth fold line 44. Second open edge 52 is substantially parallel to the edge formed by second fold line 42. Second open edge 52 and second fold line 42 are substantially perpendicular to fourth fold line 44 and second side free edge 31, and are substantially aligned with first side free edge 21 and third fold line 43, respectively. When electrical box 10 is folded, second side wall portion 30 is bent along second fold line 42 to extend substantially perpendicular from back wall portion 40 and substantially parallel to first side wall portion 20. Additionally, second coupling flaps 32 extend from second side free edge 31 to attach second side wall portion 30 to first end wall portion 25.

First end wall portion 25 has a substantially flat, planar, square shape. Accordingly, first end wall portion 25 has a first pair of opposite, parallel edges formed by third fold line 43 and a first end free edge 26, and a second pair of opposite, parallel edges formed by third open edge 53 and a first back end free edge 27. First coupling flaps 28 protrude from the first end free edge 25 for engaging first side end portion 25 to second wall portion 30. First back end edge 27 has first tab 29 which protrudes therefrom to engage with receiving slot 6 of back wall portion 40. When electrical box 10 is folded, first end wall portion 25 is bent along third fold line 43 to extend substantially perpendicular to first side wall portion 20.

Second end wall portion 35 has a substantially flat, planar, square shape similar to first end wall portion 25. Accordingly, second end wall portion 35 has a first pair of opposite, parallel edges formed by fourth fold line 44 and a second end free edge 36, and a second pair of opposite, parallel edges formed by fourth open edge 54 and second back end free edge 37. Second end coupling flaps 38 protrude from second end free edge 35 for engaging first side wall portion 20. Second back end edge 37 has second tab 39 protruding therefrom for engagement with receiving slot 7 of back wall portion 40. When electrical box 10 is folded, second end wall portion 35 is bent along fourth fold line 44 to extend substantially perpendicular to second side wall portion 30.

Coupling flaps 22, 28, 32 and 38 are substantially flat, planar members. When first coupling flaps 22 are folded along first side free edge 21, first coupling flaps 22 extend substantially perpendicular to first side wall portion 20 for engaging the exterior surface of second end wall portion 35. Similarly, when second end coupling flaps 38 are folded along second end free edge 36, second end coupling flaps 38 extend substantially perpendicular to second end wall portion 35 for engaging the exterior surface of first side wall portion 20. Accordingly, first coupling flaps 22 and second end coupling flaps 38 hold second end wall portion 35 substantially perpendicular to first side wall portion 20, and provides rigidity to electrical box 10.

Further, when second coupling flaps 32 are folded along second side free edge 31, second coupling flaps 32 extend substantially perpendicular to second side wall portion 30 for engaging the exterior surface of first end wall portion 25. Similarly, when first end coupling flaps 28 are folded along first end free edge 26, first end coupling flaps 28 extend substantially perpendicular to first end wall portion 25 for engaging the exterior surface of second side wall portion 30. Accordingly, second coupling flaps 32 and first end coupling flaps 28 hold first end wall portion 25 substantially perpendicular to second side wall portion 30, and provides rigidity to electrical box 10.

FIGS. 6-10 show the bending operations of the electrical box 10 of the present invention. After the sheet material is cut in accordance with the configuration shown in FIG. 3 there remains unitary blank 2 of FIG. 4.

Figure 6:
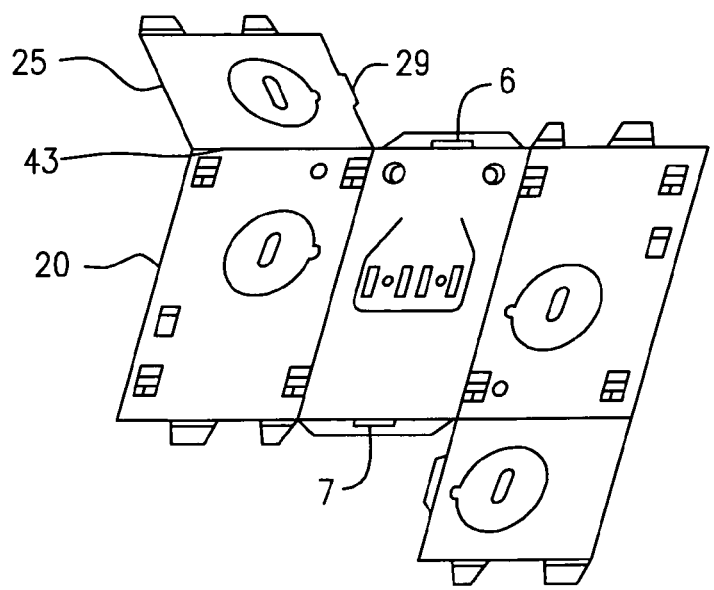
FIG. 6 is a perspective view of a step in forming the die cut blank of FIG. 5 into an electrical box.

FIG. 6 shows the first end wall portion 25 bent along the third fold line 43 to extend substantially perpendicular to the first side wall portion 20.

Figure 7:
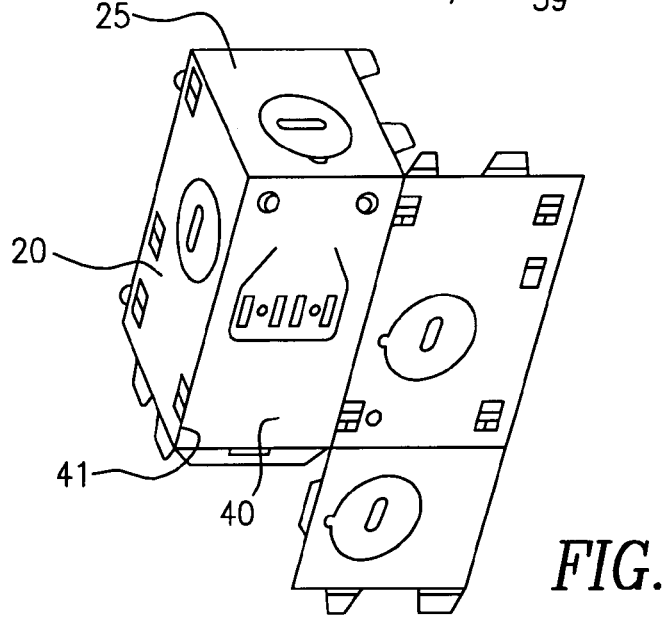
FIG. 7 is a perspective view of a step in forming the die cut blank of FIG. 5 into an electrical box.

FIG. 7 shows the first side wall portion 20 bent along the first fold line 41 to extend substantially perpendicular to the back wall portion 40. The first tab 29 of the first end wall portion 25 is placed into the receiving slot 6 of the back wall portion 40 to secure the first end wall 25 into place and perpendicular to the back wall portion 40.

Figure 8:
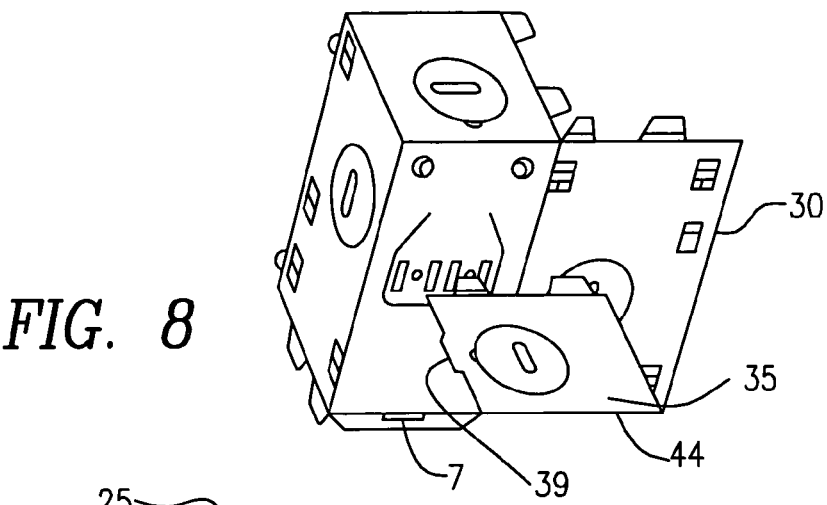
FIG. 8 is a perspective view of a step in forming the die cut blank of FIG. 5 into an electrical box.

FIG. 8 shows the second end wall portion 35 bent along the fourth fold line 44 to extend substantially perpendicular to the second side wall portion 30.

Figure 9:
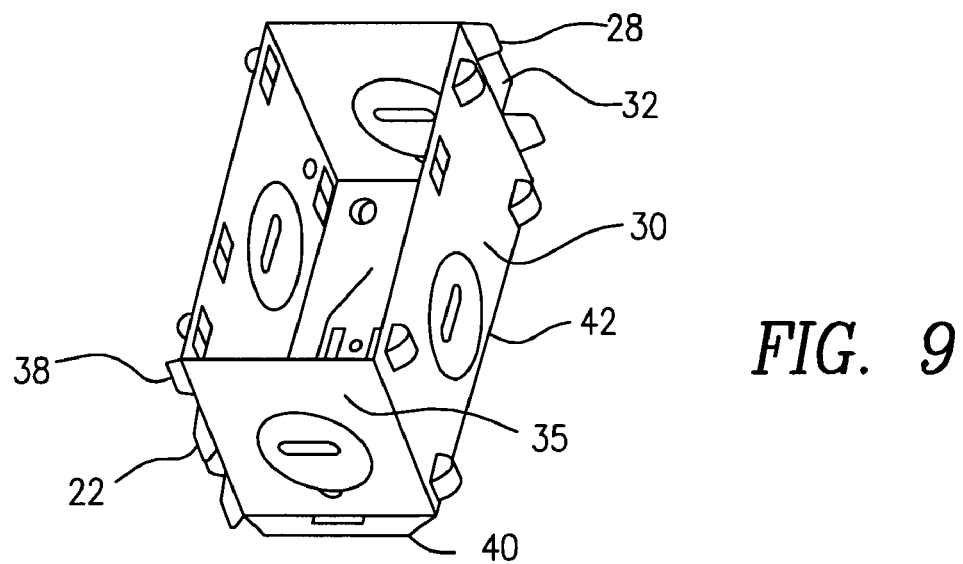
FIG. 9 is a perspective view of a step in forming the die cut blank of FIG. 5 into an electrical box.

FIG. 9 shows the second side wall portion 30 bent along the second fold line 42 to extend substantially perpendicular to the back wall portion 40. The second tab 39 of the second wall portion 35 is placed into the receiving slot 7 of the back wall portion 40 to secure the second wall 35 into place and perpendicular to the back wall portion 40.

Figure 10:
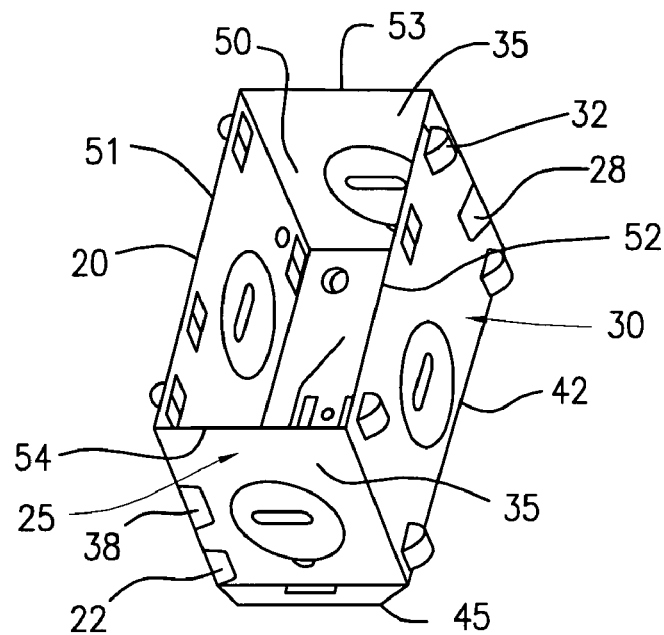
FIG. 10 is a perspective view of a step in forming the die cut blank of FIG. 5 into an electrical box.

FIG. 10 shows the coupling flaps 22, 28, 32, 38 bent to hold the first end wall 25 to the second side wall 30 and the second end wall 35 to the first side wall 20 and to provide rigidity to the electrical box 10.

The open edges 51, 52, 53 and 54 define the open face 50 of the electrical box 10 which is substantially parallel to and similar in shape as the first fold line 41, first back free edge 45, second fold line 42 and second back free edge 46 which define the perimeter of the back wall portion 40.

Similar to FIGS. 6-9, FIG. 11 shows bending operations of electrical boxes 100 which is similar to electrical box 10 of FIG. 10. Further, FIG. 11 is directed to a continuous operation of forming electrical boxes 100 by using a strip of sheet material 101 to form consecutive die cuts and bending operations thereafter. FIG. 11 shows the strip of sheet material 101 cut to form blank 102 which is similar to blank 2 of FIG. 3, however, the back wall 140 of FIG. 11 remains uncut until the electrical box 100 is completely folded.

Specifically, the end wall portions 125, 135 are bent along the third fold line 143 and fourth fold line 144, respectively, to extend substantially perpendicular to the side wall portions 120, 130. Next, the side wall portions 120, 130 are bent along the first fold line 141 and the second fold line 142, respectively, to extend substantially perpendicular to the back wall portion 140. Then coupling flaps 122, 128, 132, 138 are bent to hold the end wall portions 125, 135 together with the side wall portions 130, 120, respectively, and to provide rigidity to the electrical box 100.

The scrap material 15 is then cut from the consecutive back wall portions 140 to provide for first back free edge 145 and second back free edge 146.

The open edges 151, 152, 153 and 154 define the open face 150 of the electrical box 100 which is substantially parallel to and similar in shape as the first fold line 141, first back free edge 145, second fold line 142 and second back free edge 146 which define the perimeter of the back wall portion 140.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims attached hereto.

What is claimed is:

1. A blank for forming an electrical box comprising two side wall portions attached to either side of a back wall portion at opposing folded edges by material continuity, and one end wall portion attached to each side wall portion by material continuity and extending in opposite directions from said side wall portion, said back wall portion being defined by two opposing free edges and said two opposing folded edges and each of said sidewall portion defined by two folded edges opposing two free edges.

2. The blank of claim 1 wherein each of said side wall portions are planar rectangular shape.

3. The blank of claim 1 wherein each of said end wall portions are planar square shaped.

4. The blank of claim 1 wherein said back wall portion is similar in shape to said side wall portions.

5. The blank of claim 1 wherein said back wall portion includes at least one receiving slot for attachment of said end wall portions.

6. The blank of claim 5 wherein at least one of said end walls includes a first tab protruding therefrom to provide engagement with said at least one receiving slot of said back wall.

7. The blank of claim 1 wherein said side wall portions include at least one coupling flap extending therefrom for attachment of said side wall to an opposing end wall.

8. The blank of claim 1 wherein said end wall includes at least one end coupling flap extending therefrom for attachment to an opposing side wall.

* * * * *

UNITED STATES PATENT AND TRADEMARK OFFICE
CERTIFICATE OF CORRECTION

| | | |
|---|---|---|
| PATENT NO. | : 7,368,661 B2 | Page 1 of 1 |
| APPLICATION NO. | : 11/507884 | |
| DATED | : May 6, 2008 | |
| INVENTOR(S) | : Lalancette et al. | |

It is certified that error appears in the above-identified patent and that said Letters Patent is hereby corrected as shown below:

On the cover page the printed patent incorrectly reads, "(60) ...60/713,808, filed on Sep. 2, 2006...."; the patent should read --(60) ...60/713,808, filed on Sep. 2, 2005....--.

Signed and Sealed this

Nineteenth Day of August, 2008

JON W. DUDAS
*Director of the United States Patent and Trademark Office*